Nov. 1, 1932. W. H. COLBERT 1,885,232
MIRROR
Filed Oct. 20, 1930
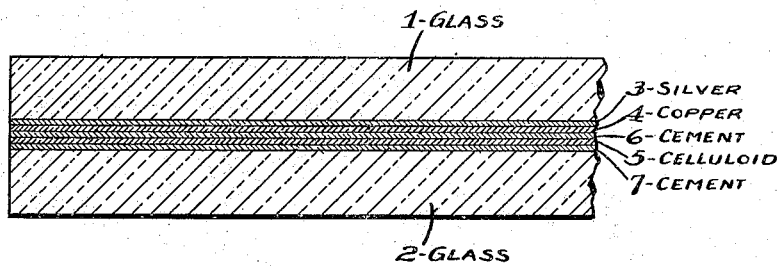
INVENTOR
Wm H. Colbert
by
James C. Bradley
Atty Patented Nov. 1, 1932

1,885,232

UNITED STATES PATENT OFFICE

WILLIAM H. COLBERT, OF BRACKENRIDGE, PENNSYLVANIA, ASSIGNOR TO DUPLATE CORPORATION, A CORPORATION OF DELAWARE

MIRROR

Application filed October 20, 1930. Serial No. 489,923.

The invention relates to mirrors and particularly to mirrors reinforced with a sheet of tough, non-shatterable material, such as celluloid. Such mirrors ordinarily comprise a pair of glass sheets one of which is silvered on its rear face, cemented to the opposite sides of a sheet of pyroxylin plastic, such as celluloid. One of the principal difficulties with a mirror of this type is the tendency of the silvered sheet of glass to separate from the celluloid, the silvering in such case adhering in part to the celluloid and in part to the glass sheet. In other cases, no separation occurs, but the compositing operation, involving as it does the application of a high degree of heat and pressure, causes a marring of the film of silver, so that the appearance of the mirror is impaired. The object of the present invention is to overcome the foregoing difficulties and provide a composite mirror in which there is no separation and which has a reflecting surface free from imperfection. Briefly stated, this is accomplished by covering the silver film on the glass by a coating of metal, such as electrically deposited copper. The copper plating thus applied protects the silver film during the compositing operation, and when once composited, there is no tendency of the plastic sheet to separate from the copper, or for the copper and silver to separate from the sheet of glass. One embodiment of the invention is illustrated in the accompanying drawing, wherein:

The figure is a section through a mirror made in accordance with the invention, the various films employed being much exaggerated in thickness for clearness of illustration.

Referring to the drawing, 1 and 2 are glass sheets, the sheet 1 being silvered on its rear face in the usual way by a coating 3 of silver or quicksilver. Upon the coating 3 is deposited electrolytically a plating or coating 4 of copper, such coating being much thicker than the silver so as to provide the necessary protection for the silvering during the compositing operation later described. The glass sheet 1 thus provided with metallic coats 3 and 4 is secured to the reinforcing sheet 5 by means of the film or layer of cement 6, and to the back of the reinforcing sheet is secured the second glass sheet 2 by means of the film or layer of cement 7.

The sheet of reinforcing material 5 is preferably pyroxylin plastic, such as celluloid, but other reinforcing may be used. The cement employed is preferably gelatin or casein applied in a thin film, although other cements may be used and if desired the rear sheet of glass 2 may be stuck to the plastic sheet 5 by making the surface of the plastic sticky by the use of a solvent in which case the softened layer of plastic acts as a cement.

Preferably the layers of cement 6 and 7 are applied to the copper coating 4 and the face of the glass sheet 2 by spraying and the plates thus prepared are assembled with the plastic sheet 5, and the sandwich thus formed is subjected to heat and pressure in the usual way, the temperature applied being about 240 degrees F. and the pressure about 150 pounds per square inch, although this may vary within a considerable range.

The invention is not limited to the use of the sheet of glass 2 as a backing for the plastic sheet 5 as a thin sheet of metal, hard rubber, or the like may be used, some backing being desirable when the reinforcing sheet is pyroxylin plastic to prevent the plastic from peeling off due to the absorption of moisture. The silvering applied is preferably metallic silver, but it will be understood that the term "silvering" applies equally well to the less desirable form of coating heretofore used in mirror work and consisting of quicksilver. The copper coating is preferably applied by electrical deposition, but may be applied in other ways, as by a precipitation or spraying method and metals other than copper may be employed, such as tin and aluminum.

What I claim is:

1. A composite mirror comprising a glass sheet silvered on its rear face, a coating of a different metal covering the silvering, a sheet of pyroxylin plastic cemented to said coating, and a third sheet of material secured to the rear face of the plastic sheet.

2. A composite mirror comprising a glass sheet silvered on its rear face, a coating of electrically deposited copper on the silvering, a sheet of pyroxylin plastic cemented to the coating and a second sheet of glass secured to the rear face of the plastic sheet.

In testimony whereof, I have hereunto subscribed my name this 22nd day of September, 1930.

WILLIAM H. COLBERT.